J. J. QUERTINMONT.
METHOD AND APPARATUS FOR MAKING WIRE GLASS.
APPLICATION FILED DEC. 7, 1907.

936,663.

Patented Oct. 12, 1909.

Witnesses

Inventor
by Jules J. Quertinmont

Attorney

UNITED STATES PATENT OFFICE.

JULES J. QUERTINMONT, OF POINT MARION, PENNSYLVANIA.

METHOD AND APPARATUS FOR MAKING WIRE-GLASS.

936,663.  Specification of Letters Patent.  Patented Oct. 12, 1909.

Application filed December 7, 1907. Serial No. 405,583.

*To all whom it may concern:*

Be it known that I, JULES J. QUERTINMONT, a citizen of the United States, residing at Point Marion, in the county of Fayette and State of Pennsylvania, have invented certain new and useful Improvements in Methods and Apparatus for Making Wire-Glass, of which the following is a specification.

My invention relates to the manufacture of wire glass, and has for its principal objects to produce a superior article of this kind in the simplest and most inexpensive manner possible, this being accomplished chiefly by doing away with all unnecessary handling and manipulation, and a material reduction in the number of steps which have heretofore been considered necessary.

My invention comprehends first a novel process for the production of wire glass cheaply and rapidly, and second, a new and useful apparatus which is especially adapted for use in carrying out the aforesaid process.

I have shown my improved apparatus in a simple form and divested of all extraneous appliances in order that its essential features may be the more readily understood.

Figure 1:
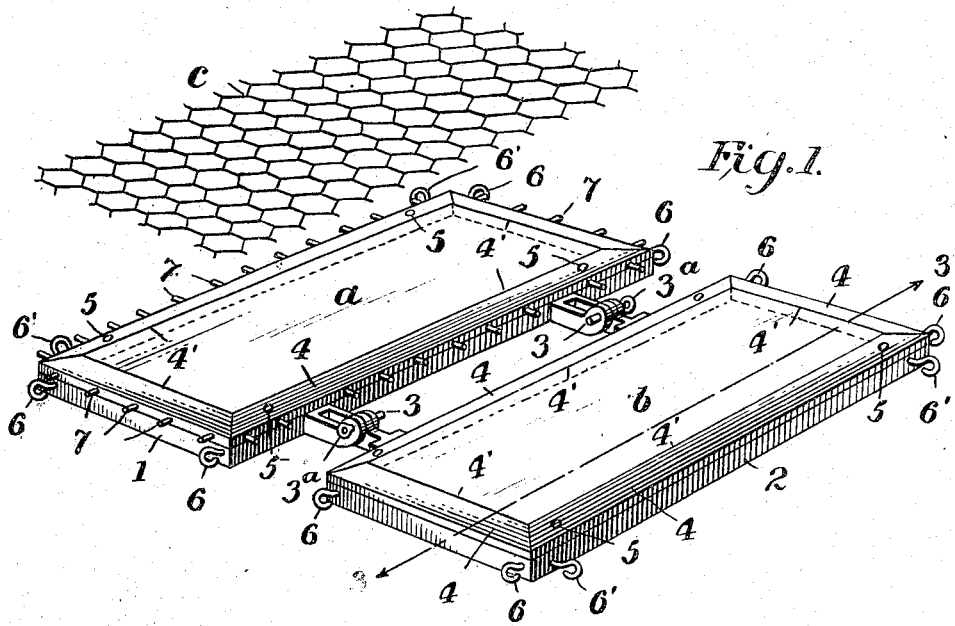
Figure 2:
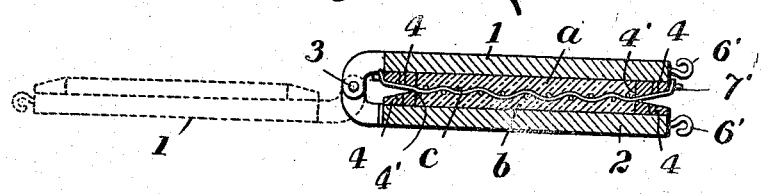
Figure 3:
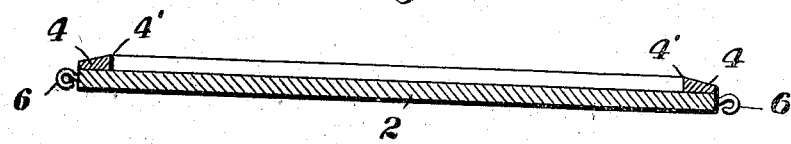

Having reference now to the accompanying drawings,—Figure 1 is a perspective view showing the platens or molds open and a wire mesh adapted to be placed in position upon one of them; Fig. 2 shows the molds closed with the formed plate of glass between them; Fig. 3 is a sectional view on line 3—3 of Fig. 1.

Like characters of reference designate like parts in each of the figures of the drawing.

1, 2 are platen or mold sections, preferably of iron, which are adapted to be detachably hinged together by suitable hinges as shown at 3, 3; the hinge pins being readily removable and provided with eyes 3ª to facilitate handling. These platen or mold sections are arranged when closed together as shown in Fig. 2 to form a closed mold for the plate of glass to be produced.

The side walls of the mold sections may be formed of separate strips secured to the backing and one or more of such strips as shown at 4 are preferably secured to the back so as to be readily detachable, as by removable pins 5, 5. This removability of certain of the wall strips is desirable to facilitate manipulation at certain times. Said strips are also preferably beveled out wood as shown, so as to give clearance and make the parts freer in action.

Hooks or lugs 6 are secured at a plurality of points on the edges of the mold sections to enable the same to be easily grasped by a suitable implement for dipping or other suitable handling operations. Spaced apart around the edge of one of the mold sections are a series of short pins 7, adapted to have stretched thereupon the wire mesh $a$ which is to be embedded within the glass.

I will now proceed to describe in detail the steps of the novel process in carrying out which the above described apparatus is particularly useful. The mold sections 1, 2 are filled with molten glass level with the tops of the wall strips by filling with a ladle or dipping said sections in a reservoir receptacle containing the glass to be worked up. The dipping is effected similarly as indicated in my copending application Serial No. 394,318, filed September 24, 1907; that is, by means of suitable chains or cables fastened to the eyes 6, 6, each one of sections 1, 2 held in a level position is gradually dipped into the molten glass when the same will flow slowly over all sides and entirely displace the air and fill every portion of the depressed section of the mold. After the same has been filled with molten glass it is slowly raised therefrom and permitted to pause in its movement out of the furnace a short time and allow all the superfluous glass owing to the sharp inner edges 4' of the beveled or outwardly inclined sides 4 of the molding frames to readily flow away from the glass held in the depressed section of the same. The mold sections are then united by the hinge pins and the wire mesh $a$ is secured upon the pins 7 of section 1 preferably though not necessarily when the glass has cooled to a plastic condition in order to prevent burning of mesh. The mold sections are then swung together by swinging over mold section 1 by means of grasping pins 6' as shown in Fig. 2, and pressed into close engagement, thus bringing the plastic surfaces of the two layers of glass $a$ and $b$ into intimate contact, firmly embedding the wire mesh in each section and reliably coalescing the two layers together. The wire mesh, as will be seen, tends to hold the glass in section 1 when swung over upon section 2. It will be apparent that by this means a homogeneous slab or plate of glass is produced without rolling or other handling which would tend to blur it or impair its natural transparency.

Other apparatus in various forms can obviously be employed in carrying out the above outlined process, and I do not desire to be restricted to any particular apparatus or to the specific details of the process except as set forth in the appended claims.

Having now described my invention, what I claim as new and desire to secure by Letters Patent is as follows:—

1. The method of making plate, window or sheet glass of double thickness which comprises the introduction of molten glass into two molds so as to freely overflow the upper inner edge of each mold until its upper surface corresponds to the plane of the top edge of each mold and carefully draining off the superfluous molten glass in each mold and bringing the exposed surfaces of said bodies of glass in the molds into intimate contact while the same is still in a plastic condition.

2. The process of making wire glass which comprises the introduction of molten glass into two molds so as to freely overflow the upper inner edge of each mold until its upper surface corresponds to the plane of the top edge of each mold and carefully draining off the superfluous molten glass in each mold, arranging a reinforcing element in the upper surface of glass of one of said molds and bringing the exposed surfaces of glass in the molds into intimate contact while the glass is still in a plastic condition.

3. The process of making wire glass which comprises the introduction of molten glass into two molds so as to freely overflow the upper inner edge of each mold until its upper surface corresponds to the plane of the top edge of each mold and carefully draining off the superfluous molten glass in each mold, disposing a wire mesh over the exposed glass surface of one of the molds and bringing the exposed surfaces of glass in the molds into intimate contact while the glass is still in a plastic condition to coalesce the same into a homogeneous slab or plate.

4. An apparatus for making plate, window or sheet glass, comprising two molds each of which consists of a base section, side and end pieces attached to the base and forming therewith a shallow depression, the upper portions of the side and end pieces being inclined downwardly from their innermost to their outer edges, said molds arranged to be brought into abutting contact to form a slab or plate therebetween.

5. An apparatus for making wire glass comprising two molds adapted to be dipped into a liquid mass and each of said molds consisting of a base section, side and end pieces attached to the base and forming therewith a shallow depression, the upper portions of the side and end pieces being inclined downwardly from their innermost to their outer edges, means on one of said molds for attaching a reinforcing element thereto and said molds arranged to be brought in abutting contact to form a slab or plate therebetween.

6. An apparatus for making wire glass, comprising two molds adapted to be dipped into a liquid mass, means for detachably securing said molds together at one edge, each of said molds consisting of a base section, side and end pieces attached to the base and forming therewith a shallow depression, the upper portions of the side and end pieces being inclined downwardly from their innermost to their outer edges, means on one of said molds for attaching a reinforcing element thereto and said molds arranged to be brought in abutting contact to form a slab or plate therebetween.

7. An apparatus for making wire glass, comprising two molds adapted to be dipped into a liquid mass, hinges for detachably securing said molds together at one edge thereof, each of said molds consisting of a base section, side and end pieces attached to the base and forming therewith a shallow depression, the upper portions of the side and end pieces being inclined downwardly from their innermost to their outer edges, and a series of pins around the edges of one of said molds to secure a wire mesh thereto.

In testimony whereof I affix my signature in presence of two witnesses.

JULES J. QUERTINMONT.

Witnesses:
W. T. DEVLIN,
FLOUSE DULIEN.